(12) United States Patent
Denteneer

(10) Patent No.: US 9,479,939 B2
(45) Date of Patent: Oct. 25, 2016

(54) CHANNEL SWITCHING IN MESH TYPE NETWORKS

(75) Inventor: Theodorus Denteneer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 349 days.

(21) Appl. No.: 13/123,065

(22) PCT Filed: Sep. 28, 2009

(86) PCT No.: PCT/IB2009/054240
§ 371 (c)(1),
(2), (4) Date: Apr. 7, 2011

(87) PCT Pub. No.: WO2010/041167
PCT Pub. Date: Apr. 15, 2010

(65) Prior Publication Data
US 2011/0199980 A1    Aug. 18, 2011

(30) Foreign Application Priority Data

Oct. 9, 2008  (EP) .................................... 08166215

(51) Int. Cl.
*H04W 4/00*     (2009.01)
*H04W 16/14*    (2009.01)
(Continued)

(52) U.S. Cl.
CPC .......... *H04W 16/14* (2013.01); *H04L 25/0202* (2013.01); *H04L 25/024* (2013.01); *H04L 45/00* (2013.01); *H04W 74/002* (2013.01); *H04W 84/18* (2013.01)

(58) Field of Classification Search
CPC ... H04W 80/04; H04W 84/12; H04W 88/06; H04W 88/08; H04W 84/18

USPC ................................ 370/326, 327, 328, 329
See application file for complete search history.

(56) References Cited

U.S. PATENT DOCUMENTS 4,908,839 A * 3/1990 Morimoto ................ H04B 1/74
375/227
6,163,680 A * 12/2000 Bridle ..................... H04W 84/08
37/347
(Continued)

FOREIGN PATENT DOCUMENTS

CN    101141176 A    3/2008
CN    101277146 A    10/2008
(Continued)

OTHER PUBLICATIONS

IEEE P802.11S / D2.02 Draft Standard—Part 11: Wireless LAN Medium Access Control (MAC) and Physical Layer (PHY) specifications. Amendment 10: Mesh Networking IEEE, [Online] Sep. 2008, pp. 138-140, XP002561155 Retrieved from the Internet: URL : http ://pddocserv/specdocs/data/standards/telecom/IEEE802/IEEE802-II/mentor.ieee.org/802.11/file/lls/Draft_P802.11s_D2.02.pdf> [retrieved on Dec. 16, 2009].
(Continued)

*Primary Examiner* — Hassan Phillips
*Assistant Examiner* — Siren Wei
(74) *Attorney, Agent, or Firm* — Larry Liberchuk

(57) ABSTRACT

The present invention relates to a method and an apparatus which enable flexible channel switching by exchanging channel information among network nodes to cumulate their view of the quality and availability of the available communication channels. The network nodes can now switch to the same channel independently of one another even when initiating a switch simultaneously.

8 Claims, 6 Drawing Sheets

(51) Int. Cl.
  *H04W 74/00* (2009.01)
  *H04L 25/02* (2006.01)
  *H04L 12/701* (2013.01)
  *H04W 84/18* (2009.01)

(56) References Cited

U.S. PATENT DOCUMENTS

| | | | |
|---|---|---|---|
| 2003/0192003 A1* | 10/2003 | Das | H03M 13/09 714/758 |
| 2004/0156336 A1* | 8/2004 | McFarland et al. | 370/329 |
| 2004/0157613 A1* | 8/2004 | Steer et al. | 455/446 |
| 2005/0277423 A1* | 12/2005 | Sandhu | H04B 7/0851 455/450 |
| 2006/0146718 A1 | 7/2006 | Yarvis | |
| 2007/0060141 A1* | 3/2007 | Kangude | H04W 74/04 455/445 |
| 2007/0218890 A1* | 9/2007 | Cho | H04W 16/14 455/422.1 |
| 2008/0137620 A1* | 6/2008 | Wang | H04L 1/20 370/337 |
| 2008/0151821 A1 | 6/2008 | Cho | |
| 2008/0219323 A1* | 9/2008 | Desai et al. | 375/132 |
| 2008/0232389 A1* | 9/2008 | Wu et al. | 370/436 |
| 2008/0240026 A1* | 10/2008 | Shih et al. | 370/329 |

FOREIGN PATENT DOCUMENTS

| | | |
|---|---|---|
| JP | 2003319465 A | 11/2003 |
| JP | 2004320249 A | 11/2004 |
| JP | 2007043681 A | 2/2007 |
| WO | WO2006099024 A2 | 9/2006 |

OTHER PUBLICATIONS

IEEE Std 802. 11-2007, Part 1, "Local and Metropolitan Area Networks—Specific Requirements", pp. 114-122.
IEEE Std 802. 11-2007, Part 11, "Wireless LAN MAC and PHY Specification".

* cited by examiner

|   |   |   |   |   |   |   |   |   |   |   |   |   |   |   |   |
|---|---|---|---|---|---|---|---|---|---|---|---|---|---|---|---|
| A | B | C | D | A | B | C | D | A | B | C | D | A | B | C | D |
| 1 | 1 | 1 | 1 | 1 | 1 | 1 | 1 | 1 | 1 | 1 | 1 | 1 | 1 | 1 | 1 |
| 1 | 0 | 1 | 1 | 0 | 0 | 1 | 1 | 0 | 0 | 0 | 1 | 0 | 0 | 0 | 0 |
| 1 | 1 | 1 | 0 | 1 | 1 | 0 | 0 | 1 | 0 | 0 | 0 | 0 | 0 | 0 | 0 |
| 0 | 1 | 0 | 1 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 |
| Table 1a | | | | Table 1b | | | | Table 1c | | | | Table 1d | | | |

FIG. 7

| A | B | C | D | A | B | C | D | A | B | C | D |
|---|---|---|---|---|---|---|---|---|---|---|---|
| 0.39 | 0.25 | 0.14 | 0.10 | 0.29 | 0.26 | 0.22 | 0.20 | 1 | 1 | 1 | 1 |
| 0.73 | 0.93 | 0.41 | 0.58 | 0.71 | 0.69 | 0.65 | 0.63 | 9 | 9 | 9 | 9 |
| 0.27 | 0.87 | 0.02 | 0.13 | 0.33 | 0.33 | 0.29 | 0.26 | 4 | 4 | 2 | 2 |
| 0.21 | 0.38 | 0.22 | 0.59 | 0.29 | 0.32 | 0.34 | 0.37 | 2 | 2 | 4 | 4 |
| 0.78 | 0.88 | 0.17 | 0.26 | 0.65 | 0.59 | 0.51 | 0.47 | 8 | 8 | 7 | 6 |
| 0.88 | 0.15 | 0.66 | 0.29 | 0.63 | 0.57 | 0.53 | 0.50 | 7 | 7 | 8 | 8 |
| 0.40 | 0.24 | 0.55 | 0.32 | 0.38 | 0.38 | 0.39 | 0.38 | 5 | 5 | 5 | 5 |
| 0.65 | 0.37 | 0.15 | 0.64 | 0.52 | 0.49 | 0.47 | 0.47 | 6 | 6 | 6 | 7 |
| 0.28 | 0.28 | 0.61 | 0.13 | 0.31 | 0.32 | 0.33 | 0.31 | 3 | 3 | 3 | 3 |
| 0.86 | 0.79 | 0.59 | 0.43 | 0.76 | 0.72 | 0.67 | 0.64 | 10 | 10 | 10 | 10 |
| Table 2a | | | | Table 2b | | | | Table 2c | | | |

FIG. 8

| A | B | C | D | A | B | C | D | A | B | C | D |
|---|---|---|---|---|---|---|---|---|---|---|---|
| 0.99 | 0.85 | 0.69 | 0.58 | 0.87 | 0.87 | 0.87 | 0.87 | 10 | 10 | 10 | 10 |
| 0.68 | 0.07 | 0.97 | 0.03 | 0.70 | 0.69 | 0.70 | 0.68 | 5 | 5 | 5 | 6 |
| 0.85 | 0.57 | 0.41 | 0.44 | 0.69 | 0.69 | 0.68 | 0.68 | 4 | 4 | 4 | 4 |
| 0.75 | 0.29 | 0.35 | 0.59 | 0.61 | 0.60 | 0.60 | 0.60 | 9 | 9 | 9 | 9 |
| 0.81 | 0.10 | 0.91 | 0.56 | 0.79 | 0.78 | 0.79 | 0.78 | 2 | 2 | 2 | 2 |
| 0.59 | 0.40 | 0.10 | 0.53 | 0.44 | 0.43 | 0.44 | 0.44 | 6 | 7 | 6 | 7 |
| 0.62 | 0.77 | 0.89 | 0.42 | 0.69 | 0.69 | 0.69 | 0.69 | 3 | 3 | 3 | 3 |
| 0.43 | 0.77 | 0.40 | 0.61 | 0.45 | 0.45 | 0.46 | 0.46 | 6 | 6 | 6 | 7 |
| 0.79 | 0.83 | 0.53 | 0.84 | 0.72 | 0.72 | 0.71 | 0.72 | 8 | 8 | 8 | 8 |
| 0.32 | 0.28 | 0.06 | 0.04 | 0.23 | 0.23 | 0.22 | 0.22 | 1 | 1 | 1 | 1 |
| Table 3a | | | | Table 3b | | | | Table 3c | | | |

FIG. 9

| Name | Measurement type |
|---|---|
| Basic request | 0 |
| Clear channel assessment request | 1 |
| Receive power indication (RPI) histogram request | 2 |
| Aggregate Basic request | 3 |
| Aggregate Clear channel assessment request | 4 |
| Aggregate Reveive power indication (RPI) histogram request | 5 |
| Reserved | 6 - 255 |

FIG. 10

CHANNEL SWITCHING IN MESH TYPE NETWORKS

FIELD OF THE INVENTION

The present invention generally relates to an apparatus, a system, a method, and a computer program product for checking availability of channels in wireless transmission systems such as—but not restricted to—a mesh of a wireless local area network (WLAN).

BACKGROUND OF THE INVENTION

In WLAN deployments without mesh services, end stations (STAs) must associate with an access point (AP) in order to gain access to the network. These end stations are dependent on the AP with which they are associated to communicate.

A so-called mesh network appears functionally equivalent to a broadcast Ethernet from the perspective of other networks and higher layer protocols. As an example, the mesh network may be an LAN according to the IEEE (Institute of Electrical and Electronics Engineers) 802.11 specifications, where links and control elements forward frames among the network members. Thus, it normally appears as if all radio nodes or mesh points (MPs) in a mesh are directly connected at the link layer. This functionality is transparent to higher layer protocols.

The current Draft Standard for Information Technology—Telecommunications and Information Exchange Between Systems—LAN/MAN Specific Requirements—Part 11: Wireless Medium Access Control (MAC) and physical layer (PHY) specifications: Amendment: Mesh Networking, IEEE Unapproved draft, IEEE P802.11s/D2.0, March 2008 includes a protocol for channel switching. However, there are still a number of problems associated with the current protocol which is described in Section 11B.4 of the above draft standard and in particular in Section 11B.4.3. Channel switching is based on a channel switch announcement frame (cf. Section 7.4.16.10), which contains a timer value and a channel precedence value, in addition to the information on the frequency channel to switch to.

According to the protocol, a radio node that detects an interference (e.g radar or the like) or another need to switch the channel, decides on a frequency channel to switch to. It then initiates a channel switch by sending new channel information in a channel switch announcement to its peers. However, it does not immediately switch channel, but defers the actual switch by an amount of time indicated by the timer value. Also, it includes a channel precedence value in the announcement. This is a random value, and is used for prioritization should more stations initiate a channel switch more or less concurrently.

Furthermore, according to the protocol, stations that receive a channel switch announcement propagate it to their peers and also set their timers. Stations that have their timers set are in the process of switching. If a node that is in the process of channel switching receives another channel switch message, it compares the channel precedence value in this new message with its current channel precedence value. Should the new value exceed the current value, then the message is accepted, the parameters of the channel switch operation are set accordingly, and the message is propagated to the peers. Should the channel precedence value be numerically smaller than the current channel precedence value, then this new message is ignored. There is a tie breaking rule based on MAC addresses should the channel precedence values be equal.

The random channel precedence values are thus included in the announcement as a decision support in case multiple stations initiate channel switch concurrently.

Thus, the channel to switch to is decided on by the radio node that detects the interference and initiates the channel switch. However, the protocol contains no guarantee, or even precaution, that this is a valid channel to switch to. A simple situation is illustrated in FIG. 2. A first radio node A initiates a channel switch and proposes to switch to channel No. 5 at a channel precedence value CPV=5. However, a second radio node B is a multi-radio node which already has one of its radio devices tuned to channel No. 5 at a higher channel precedence value CPV=7. In this case, channel switching cannot be carried out, and the mesh is broken.

A similar situation would arise if the second radio node B experienced a lot of interference on channel No. 5, e.g. due to a base station subsystem (BSS) that is located nearby.

Additionally, in the above protocol, an operational frequency channel is always characterized by a channel precedence value. To initiate switching, the initiator node must randomly choose a channel precedence value that is higher than the channel precedence value on the current channel. However, after some channel switching this may no longer be possible.

As already mentioned, the protocol is based on a timer value. Channel switching is not executed until the timer expires. However, the timer value should be chosen so that the channel switch message can be propagated to all nodes that operate on the channel to be evacuated. But an additional time margin should be allowed for, as competing messages can be initiated from the other side of the mesh.

FIG. 3 shows a schematic network environment where a channel switch message (e.g. channel switch announcement (CSA)) propagates from one end (node A) of a mesh network to the other end (node Z). Here, node A initiates a channel switch. It thus needs to set the timer in the channel switch message. The timer value T should be large enough, not only to allow the channel switch message to propagate to the edge node of the mesh (node Z) but also to let a competing message with higher channel precedence value (CPV) to propagate back, here from node Z to node A. The problem is aggravated, as the originator node (node A) of the channel switch message knows neither size nor topology of the mesh. If the timer value is not set correctly, e.g. too short, then this will result in a disconnected mesh. Thus, the channel switch time must be set so that the channel switch message can propagate from one end of the mesh to the other end, but must also have sufficient margin for a competing message to propagate back.

If, in the foregoing scenario, the timer value is set to a very conservative value, then this will result in a mesh that operates for a very long time on a frequency channel that it is no longer allowed to use. As an alternative, one can disallow the nodes to exchange messages during the switch period. However, with this option, the mesh is non-operational for a substantial period of time.

SUMMARY OF THE INVENTION

It is an object of the present invention to provide a more flexible channel switching approach which may not require new frames or algorithms.

This object is achieved by an apparatus as claimed in claim 1, a method as claimed in claim 10, and a system as claimed in claim 11.

Accordingly, individual nodes or stations can prepare for channel switching and may now switch to the same channel independently of each other even when initiating a switch simultaneously. There is no need anymore to rely on a channel precedence value for arbitration. Nodes do not just report their own view of channel availability. Rather, they report a view, in which they have aggregated their own perspective of channel availability plus the perspective of their peers operating on the same channel as they have obtained in previous reports from these peers. In doing so, the reports get combined and propagated throughout the network. By combining in the right way, the reports by all the nodes operating on the same channel converge to a similar view of the available channels According to a first aspect, a selector may be provided for selecting a channel for channel switching based on said updated channel information. Thereby, channel selection can be prepared by information exchanges in which nodes cumulate their channel information. As a further advantage, implementation is possible by appropriate extension of current channel switching approaches, and new frames or algorithms are not necessary.

According to a second aspect which can be combined with the above first aspect, a generator may be provided for generating the channel information as a binary information which indicates availability of at least one channel. Such a binary information can be propagated by a single bit per channel and thus requires little additional signaling and processing load. According to an exemplary implementation of the second aspect, the combiner may be adapted to combine own channel information and received channel information for each channel so that the updated channel information corresponds to a minimum of the own channel information and the received channel information. This simple minimum operation ensures fast information updates at little processing load.

According to a third aspect which can be combined with any one or both of the above first and second aspects, a generator may be provided for generating the channel information as a numerical information which indicates availability of at least one channel. The numerical information provides a basis for more advanced weighting schemes. According to an exemplary implementation of the third aspect, the combiner may be adapted to combine own channel information and received channel information for each channel so that the updated channel information corresponds to a weighted combination of the own channel information and the received channel information. This provides the advantage that ranks assigned to individual channels enable collective decision making even if convergence has not been completely attained. In a further specific implementation example, the weighted combination may be based on a clear channel assessment algorithm. Thereby, the proposed exchange of channel information can be implemented as a extension of current standard approaches using the clear channel assessment algorithm.

According to a fourth aspect which can be combined with any one or both of the above first and second aspects, the selector may be adapted to apply a tie breaking rule to unambiguously identify a channel to be selected. Such a tie breaking rule ensures that one channel is unambiguously identified as being the first. The tie breaking rule can be applied to break ties among channels with a numerically equal selector value, but also to break ties among channels with numerical selector values that are sufficiently close so that they are categorized to be in the same class.

According to a fifth aspect which can be combined with any one or all of the above first to third aspects, the generator may be adapted to incorporate the updated channel information in a frame for measurement requesting or reporting. Thereby, existing signaling can be used for implementing the proposed exchange of channel information.

Further advantageous developments are defined in the dependent claims.

BRIEF DESCRIPTION OF THE DRAWINGS

The present invention will now be described based on various embodiments with reference to the accompanying drawings in which:

FIG. 7 shows tables indicating evolution of a binary channel information at different nodes;

FIG. 8 shows tables indicating evolution of a numerical channel information at different nodes;

FIG. 9 shows tables indicating evolution of a numerical channel information at different nodes with a random exchange pattern; and FIG. 10 shows a table indicating extensions of a conventional frame to encompass aggregate data.

DETAILED DESCRIPTION OF EMBODIMENTS

Figure 1:
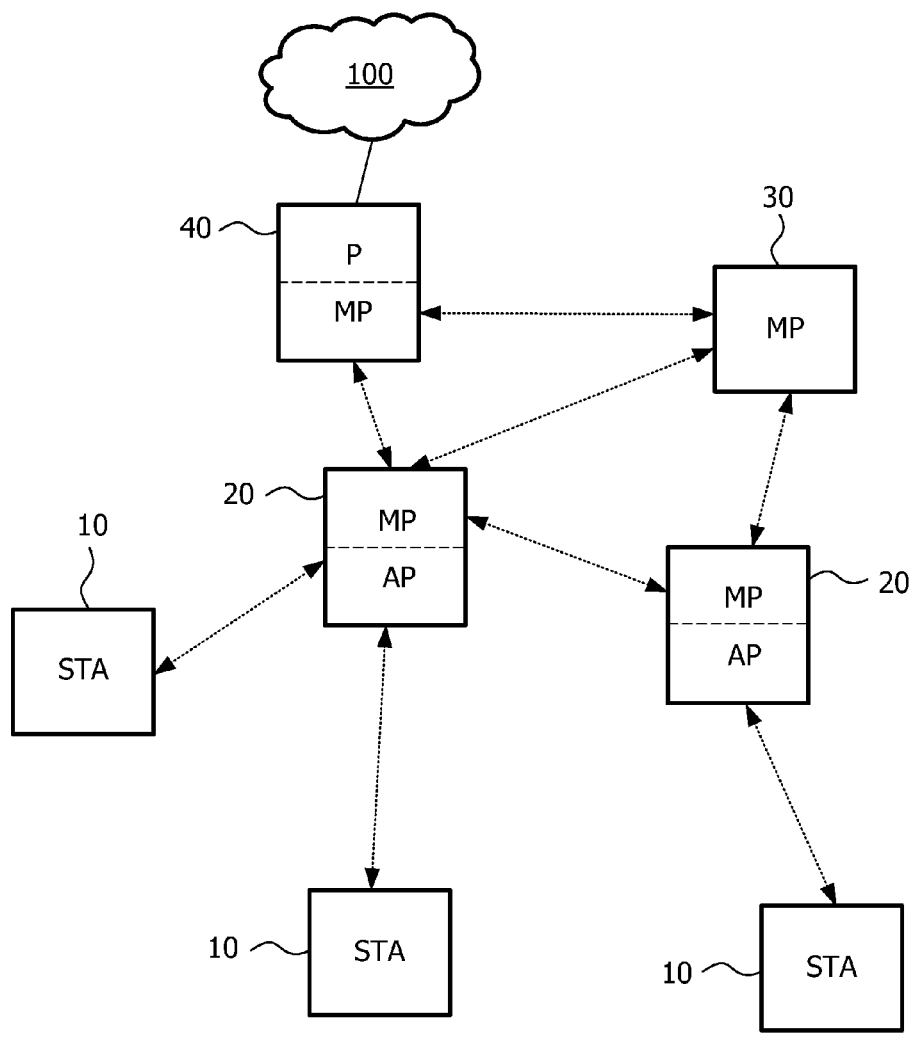
FIG. 1 shows a schematic network topology of several wireless nodes in a mesh network.
Figure 2:
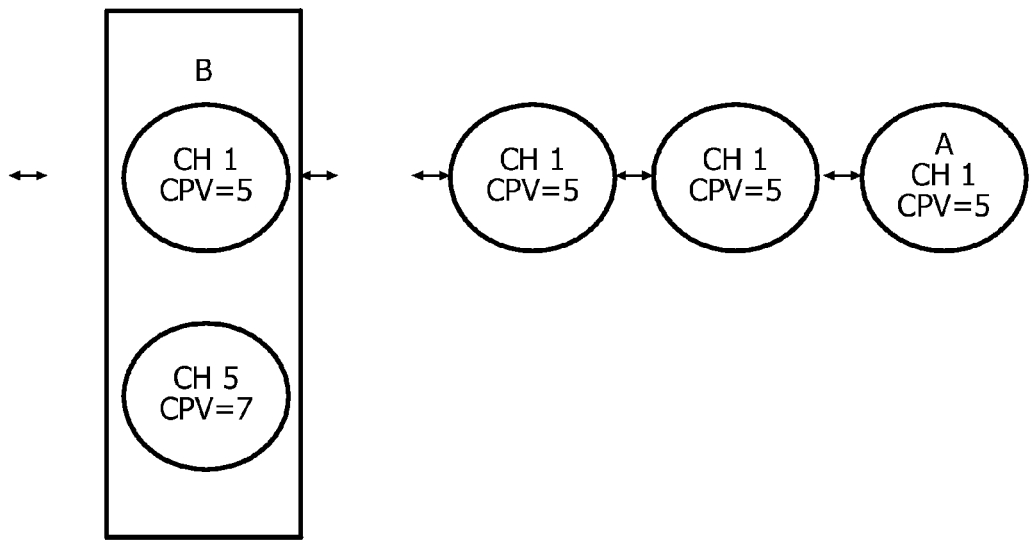
FIG. 2 show a network situation where conventional channel switching cannot be carried out.
Figure 3:
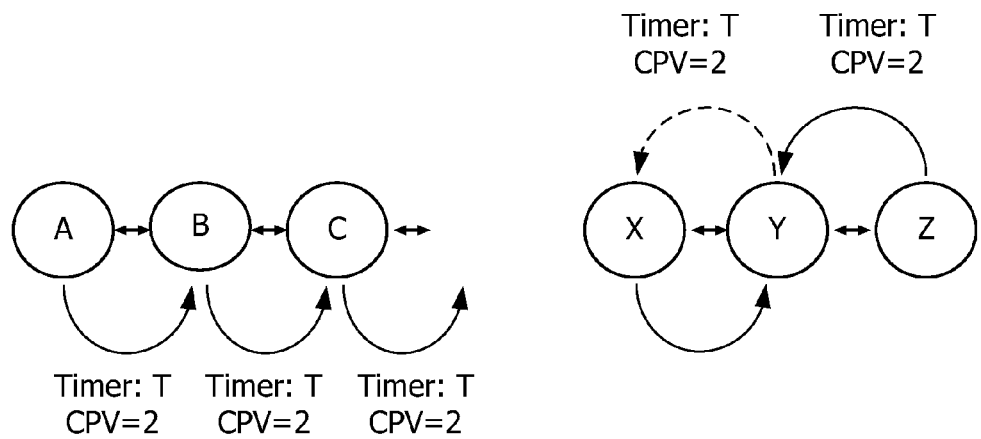
FIG. 3 shows a network environment for explaining timing constraints.

In the following, embodiments of the present invention are described on the basis of an exemplary wireless mesh network topology as shown in FIG. 1.

Many WLAN implementations can benefit from support of more flexible interoperable wireless connectivity. Functionally, an access point (AP) can be enhanced by interoperable wireless links or multi-hop paths between multiple APs. End-user devices (such as end stations (STAs)) 10 can benefit from the ability to establish interoperable peer-to-peer wireless links with neighboring end-user devices and APs in a mesh network. Mesh points (MPs) 30 can be quality of service (QoS) devices that support mesh services, i.e. they participate in interoperable formation and operation of the mesh network. An MP may be collocated with one or more other entities (e.g., AP, portal, etc.). The configuration of an MP that is collocated with an AP is referred to as a mesh access point (MAP) 20. Such a configuration allows a single entity to logically provide both mesh functionalities and AP functionalities simultaneously. End stations associate with APs to gain access to the network. The configuration of an MP that is collocated with a portal (P) is referred to as a mesh portal 40. MPs participate in mesh functionalities such as path selection and forwarding, etc. The mesh portal 40 provides an interface to other networks 100, e.g., to other IEEE 802 LAN segments.

The following embodiments are based on a channel selection and switching functionality. Channel selection is prepared by frame exchanges in which nodes cumulate their view of at least one of quality and availability of channels, e.g. frequency channels or any other type of channels for transmitting information. Nodes, devices or stations which have prepared for channel switching can now switch to the same channel independently of one another even when initiating a switch process simultaneously.

The proposed exchange of channel information may proceed via a series of frame exchanges between peer nodes in which the peer nodes exchange information on the available channels. The exchange may for example be similar to an exchange as defined in Section 11.9.6 of the current 802.11 base draft mentioned above, where nodes or end stations can request each other to measure and report one or more channels.

However, nodes do not just report their own view of channel availability. Rather, they report a view, in which they have aggregated their own perspective plus the perspective of their peers operating on the same channel. They have obtained respective channel information in previous reports from these peers. Additionally, they may report their view not just once, but a number of times. In doing so, the reports get combined and propagated throughout the network. By combining in the right way, the reports by all the nodes operating on the same channel converge to a similar view of the available channels.

Figure 4:
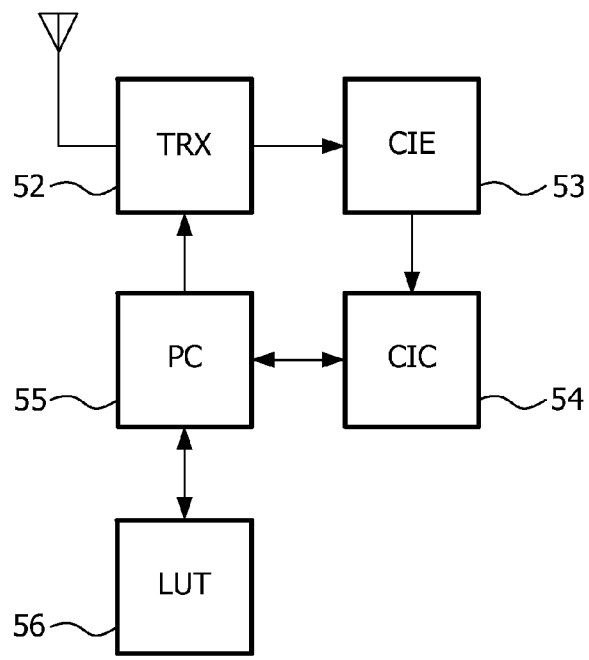
FIG. 4 shows a schematic block diagram of a radio node according to a first embodiment.

FIG. 4 shows a schematic block diagram of a controller or control functionality according to a first embodiment, which can be provided in a radio node (e.g. mesh point, mesh access point, mesh portal, or any other type of radio node) of a mesh network. It can be implemented as a discrete hardware circuit or circuitry, a chip, a chip set, a module or a software-controlled processor or computer device where the functions of FIG. 4 are provided as software programs or routines.

Advertisements can be received and transmitted by a transceiver (TRX) circuit 52 which may be provided in a radio frequency (RF) front end of the radio node. Advertisements which are initiated at the controller can be generated in a processor circuit (PC) 55 and supplied to the TRX 52 for radio transmission via at least one antenna.

Received advertisements are supplied to a channel information extraction unit or extractor (CIE) 53 in order to detect and extract advertised channel information. The extracted channel information is supplied to a channel information combining unit or combiner (CIC) 54 which combines received channel information and stored own channel information for various channels in order to update the channel information. The updated channel information can be stored in a look-up table (LUT) 56 by the processor circuit 55 or directly by the channel information combiner 54. The look-up table 56 may be provided in a memory or register or the like, e.g., as a programmable non-volatile storage.

The updated channel information can then be advertised or propagated through the mesh network by the processor circuit 55 via the TRX 52.

Figure 5:
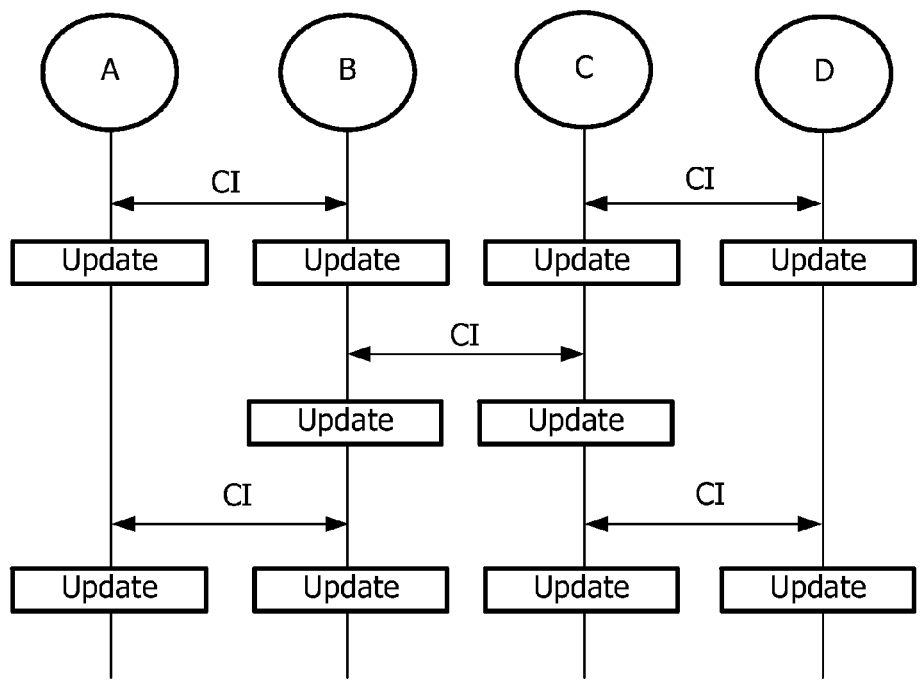
FIG. 5 shows a signaling and processing diagram indicating an information exchange procedure according to a second embodiment.

FIG. 5 shows a signaling and processing diagram indicating an example of an information exchange procedure among a chain of four nodes, labelled A, B, C, and D according to a second embodiment. In the diagram, time-dependent processing steps and information exchanges are shown, while time proceeds from top to bottom of the diagram.

The four nodes A to D have the possibility to operate on five distinct channels 1 through 5. According to the second embodiment, they use a simple binary coding scheme in which availability of a channel is indicated with one binary state (e.g. "1") and non-availability of a channel is coded with the other binary state (e.g. "0"). They then exchange the channel availability information. In this example, the information is exchanged according to the following scheme shown in FIG. 5. First, nodes A and B and nodes C and D exchange their channel information (CI) and then each node updates its channel information. Second, nodes B and C exchange and then update their channel information, and, finally, nodes A and B and nodes C and D exchange and then update their channel information again. Each information exchange is thus followed by an information update. In the current case, the information update can be carried out by applying a minimum operation to the received channel information (RCI(i)) and the available current channel information (CCI(i) for each channel i (i=1 to 5) to obtain an updated new channel information (NCI(i)) based on the following equation (1):

$$NCI(i) = \min(CCI(i), RCI(i)) \quad (1)$$

Where the new channel information NCI(i) corresponds to the smaller value of the current channel information CCI(i) and the received channel information RCI(i).

FIG. 7 shows tables 1a to 1d indicating evolution of a binary channel information at the different nodes A to D according to the second embodiment. The evolution of the channel state information at the stations is as coded in tables 1a to 1d, as time proceeds from the left table 1a to the right table 1d. As can be gathered from table 1a, the nodes A to D start the process with a different view of channel availability. However, after a series of exchanges with intermediate results indicated in tables 1b and 1c, they have converged to a common view of channel availability, as given in table 1d. This, now common, table 1d indicates availability of channels 1 and 5 and can then be used by the nodes A to D for collective decision making on a channel to switch to.

Figure 6:
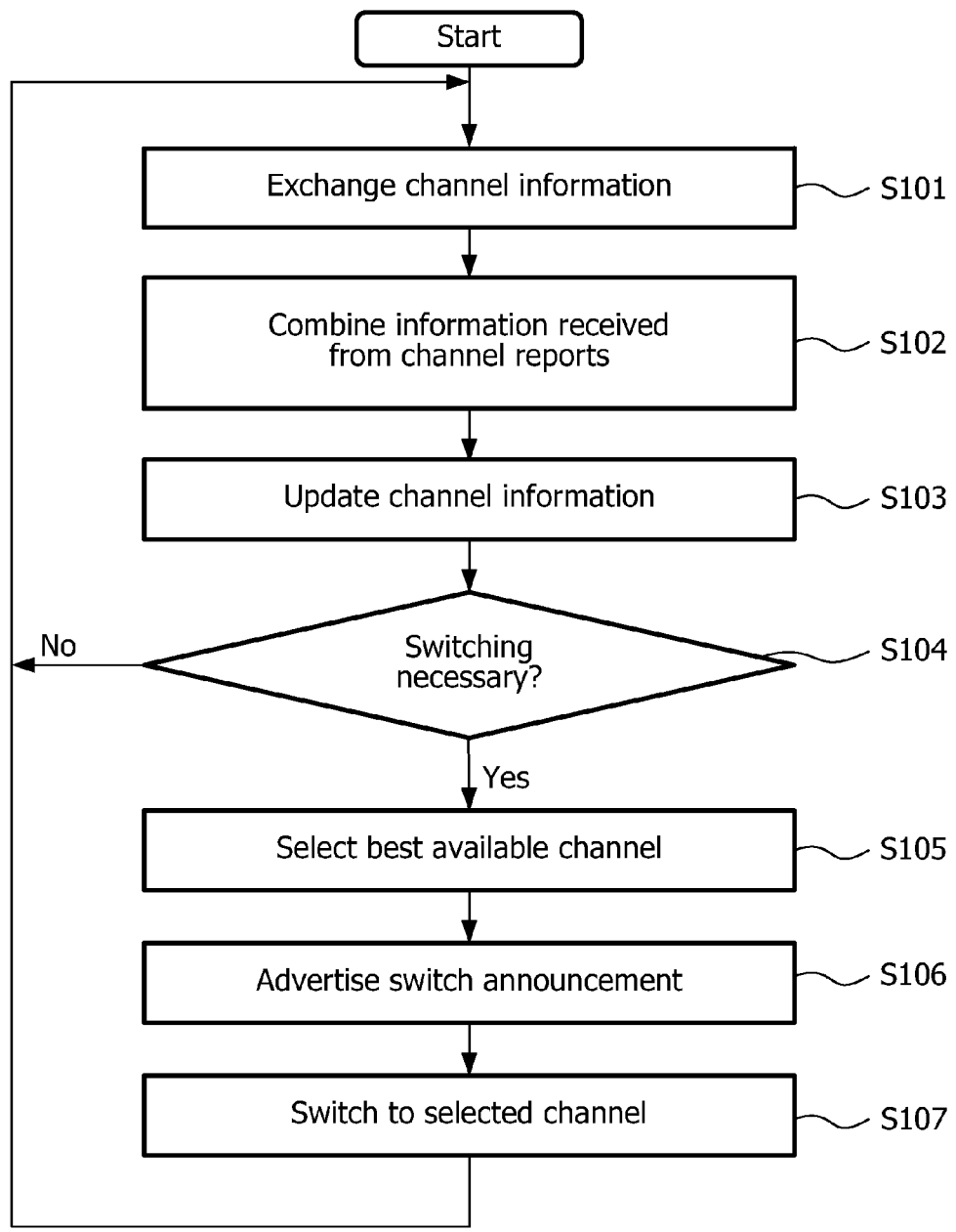
FIG. 6 shows a schematic flow diagram of a channel switching procedure according to a third embodiment.

FIG. 6 shows a schematic flow diagram of an channel selection and switching mechanism or procedure in a mesh network, according to a third embodiment.

According to FIG. 6, the procedure starts with an exchange of channel information between all or at least some of the available nodes (step S101). This exchange may be implemented in different steps and with different exchange patterns, as indicated in FIG. 5. Of course, any other exchange pattern could be used as well. In step S102, each node combines received channel information (step S102). The combined channel information is used in step S103 to update own channel information stored at each node.

Then, in step S104, it is checked whether channel switching is necessary, e.g., due to detected interference. If not, steps S101 and S103 are repeated at fixed or arbitrary time periods. If it is determined in step S104 that channel switching is required, a channel is selected in step S105 by the concerned node based on its last updated channel information. In step S106, the selected new channel is advertised or announced by the concerned node to peer nodes, e.g., via a handshake and/or a switch announcement. Finally, in step S107, the concerned node switches to the selected channel and the procedure may start again.

The procedure of FIG. 6 may be implemented as a software routine which controls the processor circuit 55 of FIG. 4.

More advanced channel information combining schemes are also possible. In the next implementation example, a chain of four nodes A to D is again considered, but now some numerical information is used to describe channel availability.

FIG. 8 shows tables 2a to 2c indicating evolution of a numerical channel information at the four different nodes A to D. The available information at the starting time is given in table 2a. Again, this channel information is exchanged between the nodes. This time, each node updates its own information table by taking a weighted sum of its current channel information CCI(i) and the incoming or received channel information RCI(i). Again, it can be seen that the nodes converge to a common view of channel availability. In this case, convergence has not been completely attained. However, the ranks which can be assigned to the various channels due to the numerical information enable collective decision making.

It is noted that the above numerical distribution technique can also be used to improve an Independent Basic Service Set (IBSS) mode of the IEEE 802.11 standard, also known as an ad hoc network. Currently, this case is treated by appointing one channel switch master who acts as if it were the AP in an infrastructure base station subsystem (BSS). However, this approach requires an elaborate algorithm to appoint and track a channel switch master. Moreover, only the channel switch master can initiate channel switching, and this requires special action if another station detects the interference on the channel and wants to initiate switching.

FIG. 9 shows tables 3a to 3c indicating evolution of a numerical channel information at different nodes with a random exchange pattern. These tables relate to an IBSS with four nodes A to D that exchange information according to a random pattern. Each node again updates its information table by taking a weighted combination of its own current channel information CCI(i) and the incoming received channel information RCI(i).

In both above exemplary cases of FIGS. 8 and 9 updates of the tables are made using standard weighted combinations as defined by the following equation:

$$NCI(i)=w*CCI(i)+(1-w)*RCI(i) \qquad (2)$$

The proposed exchange of numerical information can be implemented as an extension of the current 802.11 standard. E.g. nodes have the possibility to exchange information as in the clear channel assessment (CCA) channel information reports, as described e.g. in Section 7.3.2.22.2 of IEEE 802.11-2007, Standard for Information Technology—Telecommunications and Information Exchange Between Systems—LAN/MAN Specific Requirements—Part 11: Wireless Medium Access Control (MAC) and physical layer (PHY) specifications. This CCA value is a good metric for use in the proposed channel switching approach.

If the nodes start out with widely different views of channel availability, convergence is not so rapid. It may then happen that not exactly the same report has emerged at all the nodes so far. However, ordering of the channel availability is what really matters and that can still be the same for all nodes. In case ties are possible (or likely as in the case that the binary coding of channel quality is used) a tie breaking rule can be specified so that the nodes can unambiguously identify one channel as being the first. The tie breaking rule can also be used to break ties among channels that are categorized to be in the same class, e.g. "excellent" or "suitable", although the numerical selector values may differ.

It depends on the topology of the concerned network and channel volatility how frequently the information exchanges should take place. It can be done more frequently after mesh formation, and then at least every T time periods, where T is a parameter of the protocol and can be adapted to the size and the channel volatility of the mesh.

It could also happen that not all nodes have the same channels available on start up. However, this is not a problem. New channels can be inserted in the channel list provide at the nodes, when merging the available channel lists of the nodes involved.

The exchanged channel information may consist of two types of information, one numerical channel metrics and one binary channel metrics on the availability or non-availability of channels. These two types of information elements can then be combined appropriately.

Furthermore, the proposed channel information exchange can be carried out by defining a new frame for this, similar to the request and report measurement frames in the initially mentioned draft (see Sections 7.3.2.21-7.3.2.22). The exchange could also be implemented by modifying existing frames to include the required information. For mesh networks, both beacons, and routing messages are likely candidates. The method can also be implemented based on the current frames for measurement requesting and reporting. In particular, the current measurement request element, see FIG. 7.58 in the initially mentioned draft contains a measurement type field of one octet. Currently, only three bits of this octet are used (see Table 7.29).

FIG. 10 shows a table indicating extensions of the above conventional frame for measurement requesting and reporting. An extension of this field can be included for mesh networks to request aggregate data.

Similarly, the reporting element described in Section 7.3.2.22 of the initially described draft can be modified. In the basic report, the aggregate reporting may then use the minimum operator (min) according to FIG. 7. For the CCA report and the histogram report, a weighted sum reporting according to FIGS. 8 and 9 could be used.

In a second phase, the nodes carry out the actual channel switch. A node detecting the necessity to switch channel, e.g. after the detection of a radar signal or other interference on the operating channel, can consult its list of global channel availability created according to the channel information exchange outlined above. It can then select the best available channel for measurement requesting and reporting from this list, which channel is not equal to the current operating channel, and choose this channel to switch to. It can then advertise this new channel in a channel switch announcement to its peer nodes, and then switch channel. Here, the procedure and frame exchange can be similar to an infrastructure BSS. In this standard frame, see Sections 7.3.2.20 and 11.9.7 of the IEEE standard 802.11-2007, there are a number of additional information elements in the frame, such as an indicator whether messages are permitted during the channel switch, and the time until the switch. These can be used in combination with the proposed selecting and switching approach.

In summary, a method and a apparatus have been described, which enable flexible channel switching by exchanging channel information among network nodes to cumulate their view of the quality and availability of the available communication channels. The network nodes can now switch to the same channel independently of one another even when initiating a switch simultaneously.

It is noted that the present invention is not restricted to the above embodiments and can be used for any network environment which allows advertisement of channel information. The proposed procedure can be used in connection with any kind of channel information which needs to be advertised. It is thus not limited to the specific binary or numerical advertisements described in the above embodiments. The channel information may be any type of information.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfill the functions of several items recited in the claims. The mere fact that certain measures are recited in mutually different dependent claims does not indicate that a combination of these measures cannot be used to advantage. A computer program used for controlling processor to perform the claimed features may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. An apparatus for checking channel availability to provide channel switching in a mesh network, said apparatus comprising:
   a receiver configured to receive at least one item of channel information advertised by peer nodes in said mesh network, each item of channel information comprising an indication of whether a channel in the network is available;
   a combiner configured to combine channel information generated by said apparatus with said received channel information thereby to provide an updated channel information, the received channel information being obtained from a received frame for measurement requesting and reporting;
   a propagator configured to propagate said updated channel information through said mesh network; and
   a selector configured to select a channel for channel switching based on said updated channel information, wherein the updated channel information corresponds to a weighted sum of said channel information having a first weight and said received channel information having a second weight, wherein said weighted sum is based on a clear channel assessment algorithm, and wherein said selector is adapted to select the channel based on said updated channel information.

2. The apparatus according to claim 1, wherein said channel information is binary information.

3. The apparatus according to claim 2, wherein said weighted sum further corresponds to a minimum of said channel information and said received channel information.

4. The apparatus according to claim 1 wherein said selector is adapted to apply a tie breaking rule to identify a channel to be selected.

5. The apparatus according to claim 1, further comprising a generator configured to incorporate said updated channel information in the received frame for measurement requesting and reporting.

6. A method of checking channel availability to provide channel switching in a mesh network, said method comprising:
   receiving at least one item of channel information advertised by peer nodes at a network node in said mesh network, each item of channel information comprising an indication of whether a channel in the network is available;
   combining channel information generated by said network node with said received channel information thereby to provide an updated channel information, the received channel information being obtained from a received frame for measurement requesting and reporting; propagating said updated channel information from said network node through said mesh network; and
   selecting a channel for channel switching based on said updated channel information, wherein the updated channel information corresponds to a weighted sum of said channel information having a first weight and said received channel information having a second weight, wherein said weighted sum is based on a clear channel assessment algorithm, such that the channel is selected based on said updated channel information.

7. A system for channel switching in a mesh network, said system comprising at least one network node comprising an apparatus according to claim 1.

8. A non-transitory computer readable medium with instructions stored therein which, upon execution, instruct at least one processor to:
   receive at least one item of channel information advertised by peer nodes at a network node in a mesh network, each item of channel information comprising an indication of whether a channel in the network is available;
   combine channel information provided at said network node with said received channel information thereby to provide an updated channel information, the received channel information being obtained from a received frame for measurement requesting and reporting;
   propagate said updated channel information from said network node through said mesh network; and
   select a channel for channel switching based on said updated channel information, wherein the updated channel information corresponds to a weighted sum of said channel information having a first weight and said received channel information having a second weight, wherein said weighted sum is based on a clear channel assessment algorithm, such that the channel is selected based on said updated channel information.

* * * * *